United States Patent
Jeong et al.

(10) Patent No.: US 9,933,939 B2
(45) Date of Patent: Apr. 3, 2018

(54) ELECTRONIC DEVICE AND DISPLAY METHOD THEREOF

(71) Applicant: Samsung Electronics Co., Ltd., Suwon-si, Gyeonggi-do (KR)

(72) Inventors: Hye Soon Jeong, Chilgok-gun (KR); Tae Kyoung Kim, Gumi-si (KR); Dae Sik Hwang, Daegu (KR); Sang Hyuk Koh, Jeju-si (KR); Eun Joo Kim, Seoul (KR); Jeong Hun Kim, Hwaseong-si (KR); Hyun Suk Choi, Daegu (KR); Sun Yeal Hong, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

(21) Appl. No.: 14/842,437

(22) Filed: Sep. 1, 2015

(65) Prior Publication Data

US 2016/0062648 A1    Mar. 3, 2016

(30) Foreign Application Priority Data

Sep. 2, 2014    (KR) .................. 10-2014-0116327

(51) Int. Cl.
*G06F 3/0488* (2013.01)
*G06F 3/0484* (2013.01)
*G06F 1/16* (2006.01)

(52) U.S. Cl.
CPC ........ *G06F 3/04886* (2013.01); *G06F 1/1626* (2013.01); *G06F 1/1637* (2013.01); *G06F 3/04883* (2013.01); *G06F 2203/04803* (2013.01); *G06F 2203/04804* (2013.01)

(58) Field of Classification Search
CPC .. G06F 3/0488; G06F 3/04883; G06F 3/0486; G06F 3/04817; G06F 3/0482; G06F 3/04842; G06F 3/04886; G06F 3/04845; G06F 2203/04803; G09G 2380/02; G09G 2340/045; G09G 2340/0407; G09G 2354/00
See application file for complete search history.

(56) References Cited

U.S. PATENT DOCUMENTS

| | | | | |
|---|---|---|---|---|
| 8,302,026 B2 * | 10/2012 | Wang | .................... | G06F 3/0481 715/769 |
| 8,502,788 B2 * | 8/2013 | Cho | ..................... | G06F 1/1626 345/173 |
| 8,831,694 B1 * | 9/2014 | Rao | ......................... | G06F 21/32 379/433.12 |
| 9,348,456 B2 * | 5/2016 | Hwang | ................. | G06F 3/0416 |
| 9,448,592 B2 * | 9/2016 | Jin | ...................... | H01L 51/5253 |
| 9,454,179 B2 * | 9/2016 | Shin | ....................... | G06F 3/041 |

(Continued)

FOREIGN PATENT DOCUMENTS

KR    10-2013-0127050 A    11/2013

*Primary Examiner* — Dismery Mercedes
(74) *Attorney, Agent, or Firm* — Jefferson IP Law, LLP

(57) ABSTRACT

An electronic device is provided. The electronic device includes a display including a first area displaying first contents and a second area connected with the first area and displaying second contents, and a control module configured to control to expand and display the first contents in a part of the second area, and to display third contents in a remainder of the second area, if a first screen change event occurs.

22 Claims, 7 Drawing Sheets

(56) References Cited

U.S. PATENT DOCUMENTS

| | | | |
|---|---|---|---|
| 9,466,265 B2* | 10/2016 | Cho | G09G 5/22 |
| 9,594,501 B2* | 3/2017 | Lim | G06F 3/04886 |
| 9,632,653 B2* | 4/2017 | Ko | G06F 3/04886 |
| 9,645,663 B2* | 5/2017 | Mavrody | G06F 3/0412 |
| 9,651,989 B2* | 5/2017 | Kim | G06F 3/0487 |
| 2008/0119237 A1* | 5/2008 | Kim | G06F 3/0481 |
| | | | 455/566 |
| 2009/0184935 A1* | 7/2009 | Kim | G06F 3/0416 |
| | | | 345/173 |
| 2011/0164062 A1* | 7/2011 | Nakamura | G01C 21/3664 |
| | | | 345/660 |
| 2011/0209098 A1* | 8/2011 | Hinckley | G06F 3/0483 |
| | | | 715/863 |
| 2013/0002133 A1* | 1/2013 | Jin | G09F 9/33 |
| | | | 313/511 |
| 2013/0076649 A1* | 3/2013 | Myers | H04M 1/0268 |
| | | | 345/173 |
| 2013/0145311 A1 | 6/2013 | Joo | |
| 2013/0167078 A1* | 6/2013 | Monnig | G06F 3/0484 |
| | | | 715/800 |
| 2013/0178248 A1* | 7/2013 | Kim | H04M 1/0268 |
| | | | 455/566 |
| 2013/0234982 A1* | 9/2013 | Kang | G06F 3/044 |
| | | | 345/174 |
| 2013/0257768 A1* | 10/2013 | Lee | G06F 3/0416 |
| | | | 345/173 |
| 2013/0300697 A1* | 11/2013 | Kim | G06F 1/1626 |
| | | | 345/173 |
| 2013/0321340 A1* | 12/2013 | Seo | G06F 1/1641 |
| | | | 345/174 |
| 2013/0335453 A1 | 12/2013 | Lim et al. | |
| 2014/0053097 A1* | 2/2014 | Shin | G06F 9/4443 |
| | | | 715/779 |
| 2014/0118271 A1 | 5/2014 | Lee et al. | |
| 2014/0123052 A1* | 5/2014 | Chaudhri | G06F 3/04886 |
| | | | 715/773 |
| 2014/0285449 A1* | 9/2014 | Cho | G06F 3/0412 |
| | | | 345/173 |
| 2014/0289668 A1* | 9/2014 | Mavrody | G06F 3/04886 |
| | | | 715/781 |
| 2014/0300557 A1* | 10/2014 | Cho | G09G 5/22 |
| | | | 345/173 |
| 2014/0304651 A1* | 10/2014 | Johansson | G06F 3/0482 |
| | | | 715/810 |
| 2015/0002411 A1* | 1/2015 | Hwang | G06F 3/0416 |
| | | | 345/173 |
| 2015/0186024 A1* | 7/2015 | Hong | G06F 9/542 |
| | | | 715/800 |
| 2015/0242006 A1 | 8/2015 | Kim et al. | |
| 2015/0261376 A1* | 9/2015 | Kim | G06F 3/0487 |
| | | | 345/173 |

\* cited by examiner

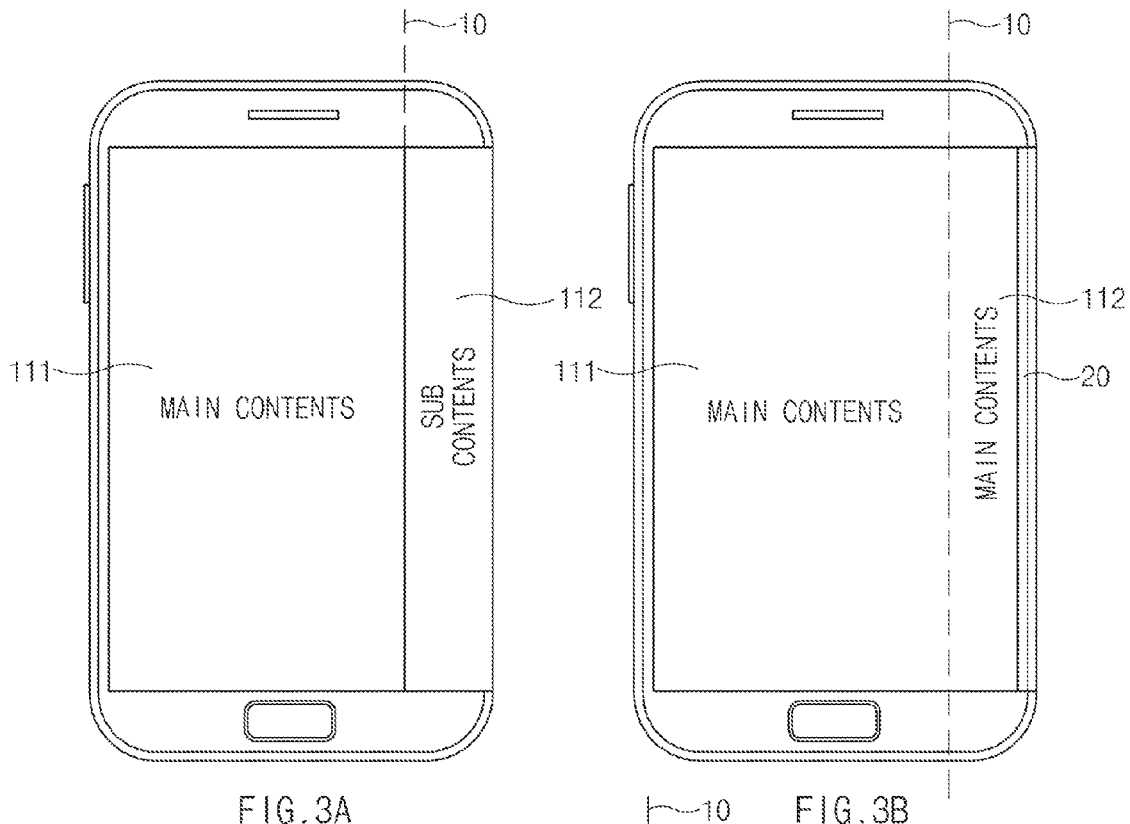
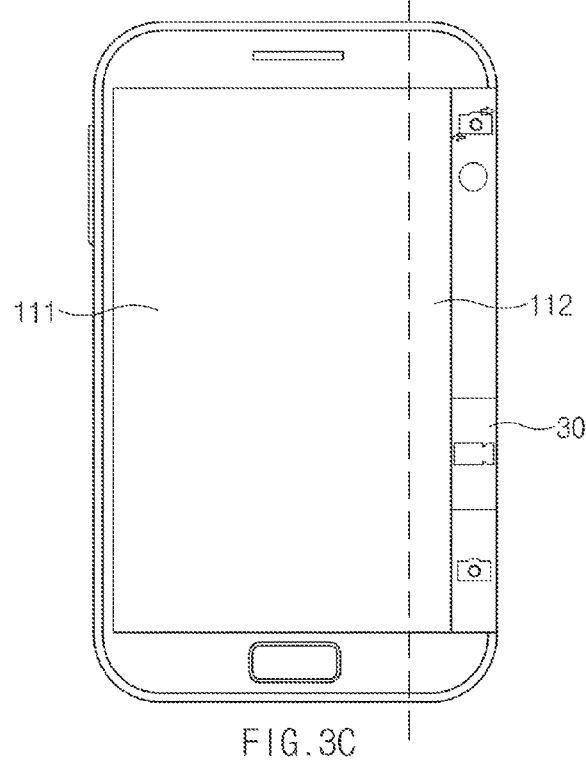

ELECTRONIC DEVICE AND DISPLAY METHOD THEREOF

CROSS-REFERENCE TO RELATED APPLICATION(S)

This application claims the benefit under 35 U.S.C. § 119(a) of a Korean patent application filed on Sep. 2, 2014 in the Korean Intellectual Property Office and assigned Serial number 10-2014-0116327, the entire disclosure of which is hereby incorporated by reference.

TECHNICAL FIELD

The present disclosure relates to an electronic device including a plurality of display areas and a display method thereof.

BACKGROUND

Various kinds of electronic devices may be developed and supplied thanks to the advancement of electronic technologies. In particular, the supply of electronic devices such as a smart phone, a notebook personal computer (PC), a tablet PC, a digital camera, a smart television (TV), and the like may be expanded, and a display may be applied to most electronic devices that are recently developed.

As the use of electronic devices increases, user needs for various functions may also increase. Thanks to the effort of manufacturers for satisfying the user needs, there may be developed and supplied products with new functions, such as three-dimensional (3D) contents, a full high-definition (FHD) display, a flexible display, a bent (or curved) display, and the like.

An electronic device that includes a plurality of display areas may be generally divided into a main area and a sub area, and the main area and the sub area may be continuous. In this case, contents displayed at the main area may be obstructed by contents displayed at the sub area. Since a screen size of the sub area is small, contents to be displayed may be restrictive.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a display method thereof, capable of changing a display area of specific contents based on use intention of a user.

In accordance with an aspect of the present disclosure, an electronic device is provided. The electronic device includes a display including a first area displaying first contents and a second area connected with the first area and displaying second contents, and a control module configured to control to expand and display the first contents in a part of the second area and to display third contents in a remainder of the second area, if a first screen change event occurs.

In accordance with another aspect of the present disclosure, a display method of an electronic device is provided. The method includes displaying first contents in a first area, displaying second contents in a second area connected with the first area, expanding and displaying the first contents in a part of the second area, and displaying third contents in a remainder of the second area, if a first screen change event occurs.

In accordance with an aspect of the present disclosure, a computer-readable recording method is provided. The non-transitory computer-readable recording method includes a program, the program performing a method including displaying first contents at a first area, displaying second contents at a second area connected with the first area, expanding and displaying the first contents in a part of the second area, and displaying third contents in a remainder of the second area, if a first screen change event occurs.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A, 3B, and 3C are diagrams schematically illustrating a screen change operation according to various embodiments of the present disclosure;

Throughout the drawings, it should be noted that like reference numbers are used to depict the same or similar elements, features, and structures.

DETAILED DESCRIPTION

Figure 1:
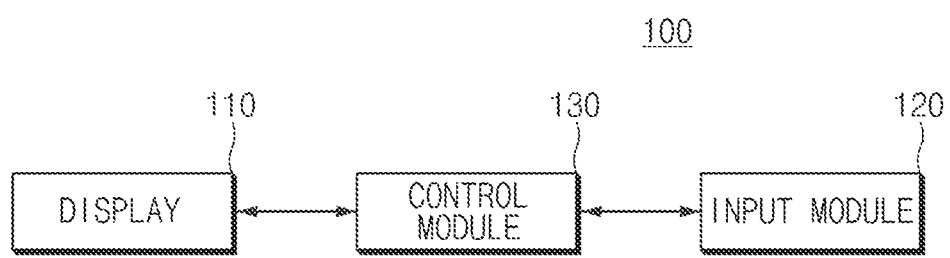
FIG. 1 is a block diagram schematically illustrating an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modification of the various embodiments described herein can be made without departing from the scope and spirit of the present disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor (AP)) which may perform corresponding operations by executing one or more software programs which are stored in a memory device.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to various embodiments of the present disclosure, the electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices) receiving a user input in an idle mode, navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internes of things (e.g., light bulbs, various sensors, electric or gas meters, sprinkler devices, fire alarms, thermostats, street lamps, toasters, exercise equipment, hot water tanks, heaters, boilers, and the like).

According to a certain embodiment of the present disclosure, the electronic devices may include at least one of furniture or buildings/structures, electronic boards, electronic signature receiving devices, projectors, or various measuring instruments (e.g., water meters, electricity meters, gas meters, or wave meters, and the like). The electronic devices according to an embodiment of the present disclosure may be one or more combinations of the above-mentioned devices. According to a certain embodiment of the present disclosure, an electronic device may be a flexible electronic. Also, electronic devices according to various embodiments of the present disclosure are not limited to the above-mentioned devices, and may include new electronic devices according to technology development Hereinafter, electronic devices according to an embodiment of the present disclosure will be described with reference to the accompanying drawings. The term "user" used herein may refer to a person who uses an electronic device or may refer to a device (e.g., an artificial electronic device) that uses an electronic device.

FIG. 1 is a block diagram schematically illustrating an electronic device according to various embodiments of the present disclosure.

Referring to FIG. 1, an electronic device 100 may include a display 110, an input module 120, or a control module 130.

The display 110 may display contents. According to an embodiment of the present disclosure, the display 110 may include a first area for displaying main contents and a second area for displaying sub contents. According to an embodiment of the present disclosure, the first area may be a flat area, and at least a part of the second area may be a curved area. The first area and the second area of the display 110 may be described with reference to FIGS. 2A and 2B.

Figure 2A:
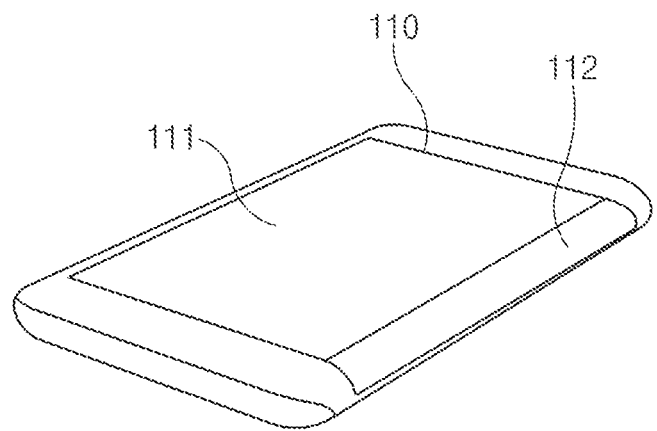
FIGS. 2A and 2B are diagrams schematically illustrating a display according to various embodiments of the present disclosure.
Figure 2B:
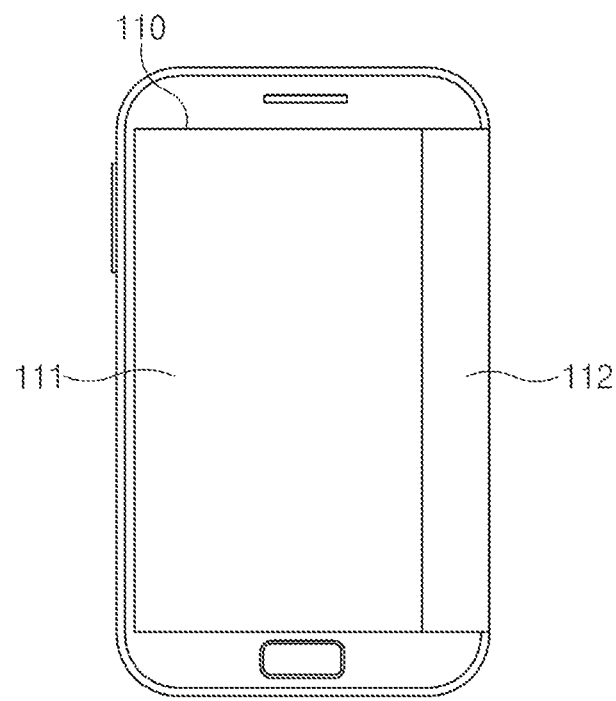

FIGS. 2A and 2B are diagrams schematically illustrating a display according to various embodiments of the present disclosure.

Referring to FIGS. 2A and 2B, a display 110 may include a first area 111 and a second area 112. Main contents (or first contents) may be displayed in the first area 111, and sub contents (or second contents) may be displayed in the second area 112. According to an embodiment of the present disclosure, the main contents may include an execution screen of an application, a lock screen, and a main screen (or a home screen). The lock screen may mean a screen for receiving user manipulation such as a password input, a touch, and the like to enter the main screen. According to an embodiment of the present disclosure, the sub contents may include an application icon, provided independently of the main contents, or a variety of information (e.g., alarm, schedule, incoming call, mail, notification, stock price information, time information, and the like).

According to an embodiment of the present disclosure, the first area 111 may be a flat area, and at least a part of the second area may be curved (or bent). According to an embodiment of the present disclosure, the first area 111 and the second area 112 may be physically interconnected. For example, referring to FIG. 2A, the display 110 may include the first area 111 of a flat shape and the second area 112 of a curved (or bent) shape which extends from a right side of the first area 111 and is downwardly curved.

Referring to FIGS. 2A and 2B, an embodiment of the inventive concept is exemplified as the second area 112 is placed at the right side of the first area 111. However, the scope and spirit of the present disclosure may not be limited thereto. According to various embodiments of the present disclosure, the second area 112 may be placed on at least one of a top end portion, a bottom end portion, a left side, a right side, or a rear surface of the first area 111. According to various embodiments of the present disclosure, the display 110 may include a plurality of second areas 112. According to various embodiments of the present disclosure, the first and second areas 111 and 112 may include at least one of a plurality of displays which are defined by logically partitioning a display, at least one of a plurality of displays which are defined by physically separating a display, or a display of other electronic device functionally connected thereto.

According to an embodiment of the present disclosure, in the case where a lock screen or a main screen is displayed in the first area 111, a background image of the lock screen or the main screen may be displayed in the second area 112. The background image may be continuously displayed in the first area 111 and the second area 112, thereby making it possible for a user to feel the sense of unity.

An input module 120 may receive user manipulation. According to an embodiment of the present disclosure, the input module 120 may receive touch manipulation from a user. For example, the input module 120 may receive touch manipulation such as a tap, a swipe, a flick, and the like.

According to an embodiment of the present disclosure, the input module 120 may be implemented with a touch screen or a touch pad that operates by a touch input of a user.

A control module 130 may control an overall operation of the electronic device 100. According to an embodiment of the present disclosure, if a first screen change event occurs, the control module 130 may perform control to expand and display the main contents (or first contents) in at least a part of the second area 112 of the display 110 and may perform control to display third contents on the rest of the second area 112.

FIGS. 3A to 3C are diagrams schematically illustrating a screen change operation according to various embodiments of the present disclosure.

Referring to FIG. 3A, main contents (or first contents) may be displayed in the first area of a display 110, and sub contents (or second contents) may be displayed in a second area 112. If a first screen change event occurs at such a state as illustrated in FIG. 3A, the main contents may be expanded in at least a part of the second area 112. For example, the main contents may be expanded in at least a part of the second area 112 such that a ratio into a second area (112) direction is changed. Alternatively, the main contents may be expanded into at least a part of the second area 112 such that a new image or icon (or object) associated with the main contents is displayed in the second area 112. According to an embodiment of the present disclosure, the main contents may be expanded into a part, continuous with the first area 111, from among the second area 112. For example, referring to FIG. 3B or FIG. 3C, the main contents may be expanded in the second area 122 from a dividing line between the first area 111 and the second area 112.

Referring to FIG. 3B, the main contents may be expanded in at least a part of the second area 112, and third contents may be displayed in the remaining part of the second area 112 other than a part where the main contents are displayed. Referring to FIG. 3B, the third contents may be a bezel image 20. Referring to FIG. 3B, the bezel image 20 may be displayed to have continuity with a bezel of the electronic device 100. According to an embodiment of the present disclosure, the bezel image 20 may be displayed with the same color as the bezel of the electronic device 100. According to an embodiment of the present disclosure, the bezel image 20 may be displayed such that there is a color difference between the bezel image 20 and the bezel of the electronic device 100 within a specific ratio. For example, in the case where a value of the color difference is set within 5%, the bezel image 20 may be displayed using a color where a difference between the bezel of the electronic device 100 and a color measurement value obtained using a color measurement device is smaller than or equal to 5%. According to an embodiment of the present disclosure, the bezel image 20 may be displayed with the same pattern as the bezel of the electronic device 100. The pattern may include a repetitive pattern or a continuous pattern. The repetitive pattern may include, for example, hair line, stitch, mesh, embossing, punching, dot, and the like. Furthermore, the continuous pattern may partially include a line or a picture which is not repetitive. According to an embodiment of the present disclosure, the bezel image 20 may include a text.

Referring to FIG. 3C, the main contents may be expanded into the whole of the second area 112. According to an embodiment of the present disclosure, the main contents may be expanded into a part of the second area 112 in such a way that a ratio of the main contents to be displayed in the first area 111 is changed, and an icon (or an object) associated with the main contents may be displayed in a remainder of the second area 112. For example, referring to FIG. 3C, in the case where a camera application is running, a shooting screen displayed in the first area 111 may be expanded and displayed to a part of the second area 112, and an object 30 (or user interface (UI) including at least one of an icon, a button, or a menu) for controlling the shooting screen may be displayed in the remainder of the second area 112.

According to an embodiment of the present disclosure, a first screen change event may be generated at a state where sub contents are displayed in the second area 112. According to an embodiment of the present disclosure, the first screen change event may include the event that an application execution screen is displayed at the first area 111 in executing an application, the event that a lock screen is displayed at the first area 111, or the event that specific touch manipulation (e.g., flick manipulation in an upward direction) is provided at the first area 111.

According to an embodiment of the present disclosure, if the main contents are expanded and displayed in the second area 112 (or if a bezel image 20 is displayed), a control module 130 may perform control to recognize only specific touch manipulation of touch manipulation provided at the second area 112. For example, if the main contents are expanded and displayed in the second area 112, the control module 130 may perform control to recognize only flick or swipe manipulation of a specific direction of touch manipulation provided at the second area 112, thereby preventing an abnormal operation due to unintended touch manipulation of a user at a situation where a user focuses the main contents.

According to an embodiment of the present disclosure, the control module 130 may perform control to display sub contents in the second area 112 if a second screen change event occurs at a state where a bezel image 20 is displayed in the second area 112. According to an embodiment of the present disclosure, the second screen change event may occur at a state where main contents are displayed in a part of the second area 112 (or third contents are displayed in the remainder of the second area 112). According to an embodiment of the present disclosure, the second screen change event may include the event that a home button is provided, the event that specific touch manipulation (e.g., flick or swipe manipulation) is provided at the second area 112, or the event that a running application is ended.

For example, if a home button is input at a state where a bezel image 20 is displayed in the second area 112, the control module 130 may perform control to reduce a display area of the main contents to the first area 111 and to display sub contents at the second area 112. For example, as illustrated in FIG. 3A, the main contents may be displayed substantially the same as before the first screen change event occurs.

As another example, if flick manipulation is provided at the second area 112 at a state where a bezel image 20 is displayed in the second area 112, the control module 130 may perform control such that sub contents are overlapped with the main contents. This will be described with reference to FIGS. 4A and 4B.

Figures 4A, 4B:
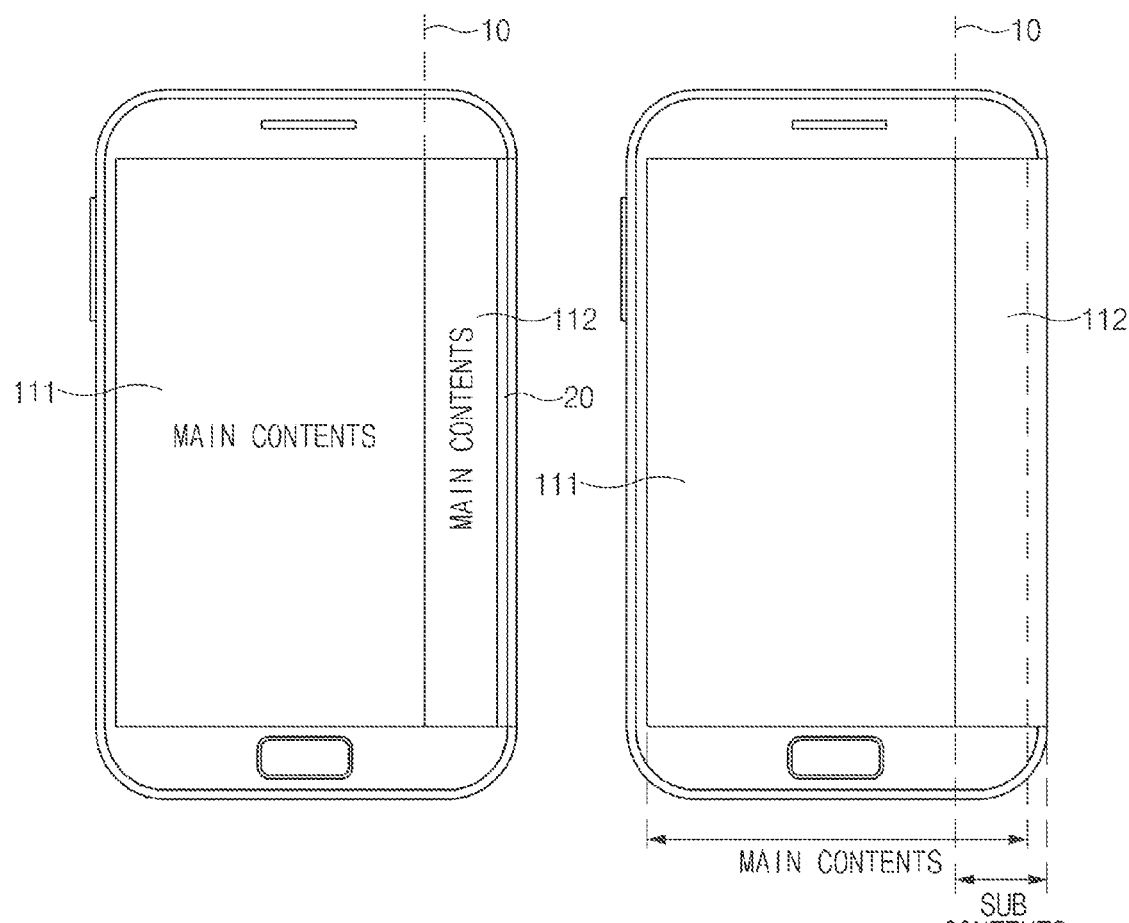
FIGS. 4A and 4B are diagrams schematically illustrating a screen change operation according to various embodiments of the present disclosure.

FIGS. 4A and 4B are diagrams schematically illustrating a screen change operation according to various embodiments of the present disclosure.

Referring to FIG. 4A, main contents may be displayed in a part of a second area 112, and third contents (e.g., a bezel image 20) may be displayed in a remainder of the second area 112. If flick manipulation is input at the second area 112 at a state where the third contents are displayed in a part of the second area 112, a control module 130 may display sub contents so as to be overlapped with the main contents displayed in the second area 112 as illustrated in FIG. 4B. Referring to FIG. 4B, sub contents may be overlapped with the main contents displayed in the second area 112 without changing of an area where main contents are displayed. At this time, an area where the main contents are displayed may be partially overlapped with an area where the sub contents are displayed. According to an embodiment of the present disclosure, the control module 130 may perform control such that sub contents displayed to be overlapped with the main contents are transparently displayed. According to an embodiment of the present disclosure, transparency of the sub contents displayed to be overlapped with the main contents may be changed by a user.

According to various embodiments of the present disclosure, when a display screen is changed according to a screen change event, the control module 130 may perform control such that a display screen is changed gradually during a specific time. This will be described with reference to FIGS. 5A and 5B.

Figures 5A, 5B:
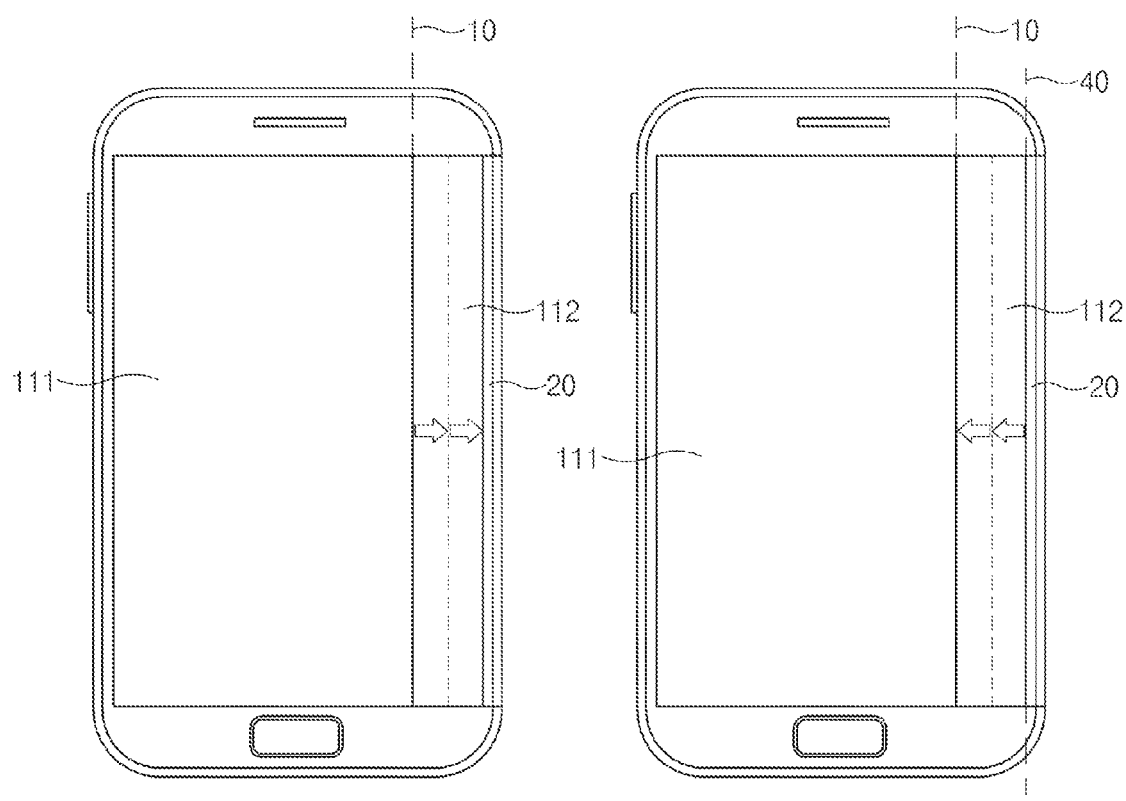
FIGS. 5A and 5B are diagrams schematically illustrating a screen change operation according to various embodiments of the present disclosure.

FIGS. 5A and 5B are diagrams schematically illustrating a screen change operation according to various embodiments of the present disclosure.

FIG. 5A may show the event that sub contents (or second contents) are changed into main contents (or first contents) and third contents (e.g., a bezel image 20) at the second area 112 when a first screen change event occurs at a state where the sub contents (or second contents) is displayed in a second area 112. Referring to FIG. 5A, the main contents may be expanded from a dividing line 10 between a first area 111 and the second area 112 gradually during a specific time. According to various embodiments of the present disclosure, as sub contents are reduced gradually during a specific time, it may be lastly changed into a bezel image 20.

FIG. 5B may show the event that sub contents (or second contents) are displayed in the second area 112 when a second screen change event occurs at a state where main contents (or first contents) and third contents (e.g., a bezel image 20) is displayed in the second area 112. Referring to FIG. 5B, the third contents may be expanded into a dividing line 10 between the first area 111 and the second area 112 from a dividing line 40 between the third contents and the main contents gradually during a specific time. According to various embodiments of the present disclosure, as the bezel image 20 is expanded gradually during a specific time, it may be lastly changed into sub contents.

According to various embodiments of the present disclosure, an electronic device may include a display including a first area displaying first contents and a second area connected with the first area and displaying second contents, and a control module configured to control to expand and display the first contents in a part of the second area and to display third contents in a remainder of the second area, if a first screen change event occurs.

According to various embodiments of the present disclosure, the first area may be flat and at least a portion of the second area may be curved.

According to various embodiments of the present disclosure, the control module is further configured to, if the first screen change event occurs, control such that the first contents are expanded from a dividing line between the first area and the second area gradually during a specific time.

According to various embodiments of the present disclosure, the third contents may be a bezel image 20.

According to various embodiments of the present disclosure, the bezel image 20 may be displayed to have continuity with a bezel of the electronic device.

According to various embodiments of the present disclosure, the bezel image 20 may include a text.

According to various embodiments of the present disclosure, the electronic device may further include an input module configured to receive touch manipulation. The control module may be further configured to control to recognize a specific touch manipulation provided in the second area, if the third contents are displayed in the remainder of the second area.

According to various embodiments of the present disclosure, the control module may be further configured to control to display the second contents in the second area, if a second screen change event occurs in a state where the third contents are displayed in the remainder of the second area.

According to various embodiments of the present disclosure, the control module may be further configured to control such that the second contents are displayed to be overlapped with the first contents.

According to various embodiments of the present disclosure, the control module may be further configured to control such that the second contents displayed to be overlapped are transparently displayed.

According to various embodiments of the present disclosure, the control module may be further configured to control to reduce an area, in which the first contents are displayed, to the first area and to display the second contents in the second area.

Figure 6:
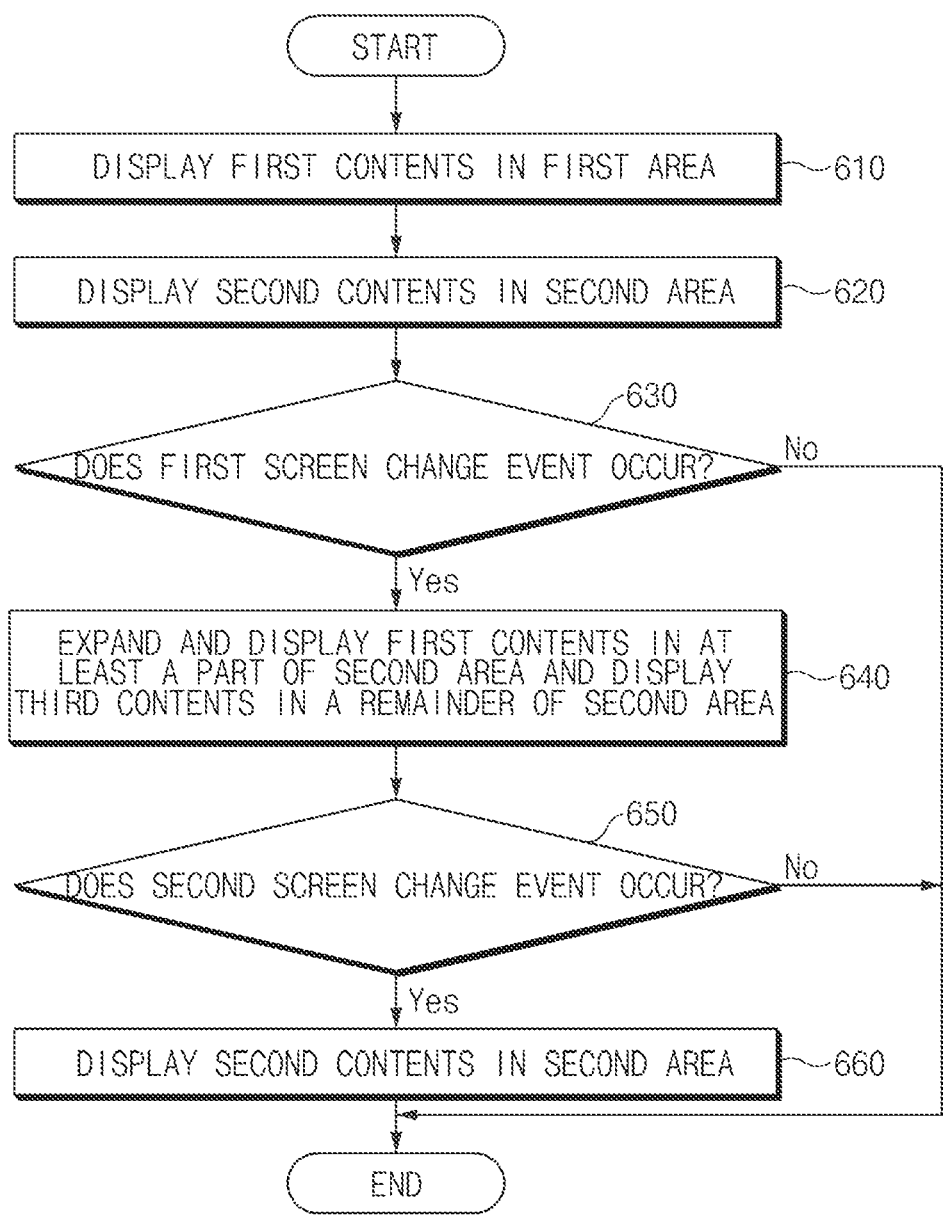
FIG. 6 is a flow chart schematically illustrating a display method of an electronic device according to various embodiments of the present disclosure.

FIG. 6 is a flow chart schematically illustrating a display method of an electronic device according to various embodiments of the present disclosure. A flow chart illustrated in FIG. 6 may be formed of operations that an electronic device 100 illustrated in FIG. 1 processes. Accordingly, unless stated below, a description on an electronic device 100 given with reference to FIGS. 1 to 5 may be applied to a flow chart illustrated in FIG. 6.

Referring to FIG. 6, in operation 610, an electronic device 100 may display first contents (or main contents) in a first area 111 of a display 110. In operation 620, the electronic device 100 may display second contents (or sub contents) in a second area 112 of the display 110. According to an embodiment of the present disclosure, the first area 111 of the display 110 may be flat, and at least a part of the second area 112 may be bent (or curved).

In operation 630, the electronic device 100 may determine whether a first screen change event occurs. According to an embodiment of the present disclosure, the first screen change event may occur at a state where sub contents are displayed in the second area 112. According to an embodiment of the present disclosure, the first screen change event may include the event that an application execution screen is displayed in the first area 111 in executing an application, the event that a lock screen is displayed in the first area 111, or the event that specific touch manipulation (e.g., flick manipulation in an upward direction) is provided at the first area 111.

If the determination result indicates that the first screen change event occurs, in operation 640, the electronic device 100 may expand and display the main contents in a part of the second area 112 and may display a bezel image 20 in a remainder of the second area 112. For example, the electronic device 100 may expand the main contents in a part of the second area 112 such that a ratio into a second area (112) direction is changed. As another example, the electronic device 100 may expand the main contents in at least a part of the second area 112 such that a new image or icon (or object) associated with the main contents is displayed in the second area 112. According to an embodiment of the present disclosure, the bezel image 20 may be displayed to have continuity with a bezel of the electronic device 100. According to an embodiment of the present disclosure, the bezel image 20 may be displayed with the same color as the bezel of the electronic device 100. According to an embodiment of the present disclosure, the bezel image 20 may include a text.

According to an embodiment of the present disclosure, if there is determined that the first screen change event occurs, the electronic device 100 may expand the main contents into the whole of the second area 112. According to an embodiment of the present disclosure, for example, the main contents may be expanded into a part of the second area 112 such that a ratio of the main contents displayed in the first area 111 is changed, and an icon (or an object) included in the main contents may be displayed in the remainder of the second area 112.

In operation 650, the electronic device 100 may determine whether a second screen change event occurs. According to an embodiment of the present disclosure, the second screen change event may occur at a state where main contents are displayed in a part of the second area 112 (or at a state where third contents are displayed in the remainder of the second area 112). According to an embodiment of the present disclosure, the second screen change event may include the event that a home button is provided, the event that specific touch manipulation (e.g., flick or swipe manipulation) is provided at the second area 112, or the event that a running application is ended.

As a consequence of determining that the second screen change event occurs, in operation 660, the electronic device 600 may display sub contents in the second area 112. According to an embodiment of the present disclosure, the electronic device 100 may reduce an area where the main contents are displayed, to the first area 111 and may display the sub contents in the second area 112. According to an embodiment of the present disclosure, the electronic device 100 may overlap and display the sub contents with the main contents displayed at the second area 112. According to an embodiment of the present disclosure, the electronic device 100 may transparently display the sub contents displayed to be overlapped with the main contents. According to an embodiment of the present disclosure, transparency of the sub contents displayed to be overlapped with the main contents may be changed by a user.

According to an embodiment of the present disclosure, when a display screen is changed according to a screen change event, the electronic device 100 may change the display screen gradually during a specific time.

According to an embodiment of the present disclosure, if third contents are displayed in the second area 112, the electronic device 100 may recognize only specific touch manipulation of touch manipulation provided at the second area 112. For example, if a bezel image 20 is displayed at the second area 112, the electronic device 100 may recognize only flick or swipe manipulation of a specific direction of touch manipulation provided at the second area 112.

According to various embodiments of the present disclosure, a display method of an electronic device may include displaying first contents in a first area, displaying second contents in a second area connected with the first area, expanding and displaying the first contents in a part of the second area and displaying third contents in the remainder of the second area, if a first screen change event occurs.

According to various embodiments of the present disclosure, the expanding and displaying of the first contents may include expanding the first contents from a dividing line between the first area and the second area gradually during a specific time.

According to various embodiments of the present disclosure, the third contents may be a bezel image 20.

According to various embodiments of the present disclosure, the displaying of the third contents in the remainder of the second area may include displaying the bezel image 20 in the remainder of the second area so as to have continuity with a bezel of the electronic device.

According to various embodiments of the present disclosure, the bezel image 20 may include a text.

According to various embodiments of the present disclosure, the display method may further include recognizing a specific touch manipulation provided in the second area, if the third contents are displayed in the remainder of the second area.

According to various embodiments of the present disclosure, the display method may further include displaying the second contents at the second area, if a second screen change event occurs at a state where the third contents are displayed in the remainder of the second area.

According to various embodiments of the present disclosure, the displaying of the second contents at the second area may include displaying the second contents so as to be overlapped with the first contents.

According to various embodiments of the present disclosure, the second contents may be transparently displayed.

According to various embodiments of the present disclosure, the displaying of the second contents at the second area may include reducing an area, in which the first contents are displayed, to the first area and displaying the second contents in the second area.

Figure 7:
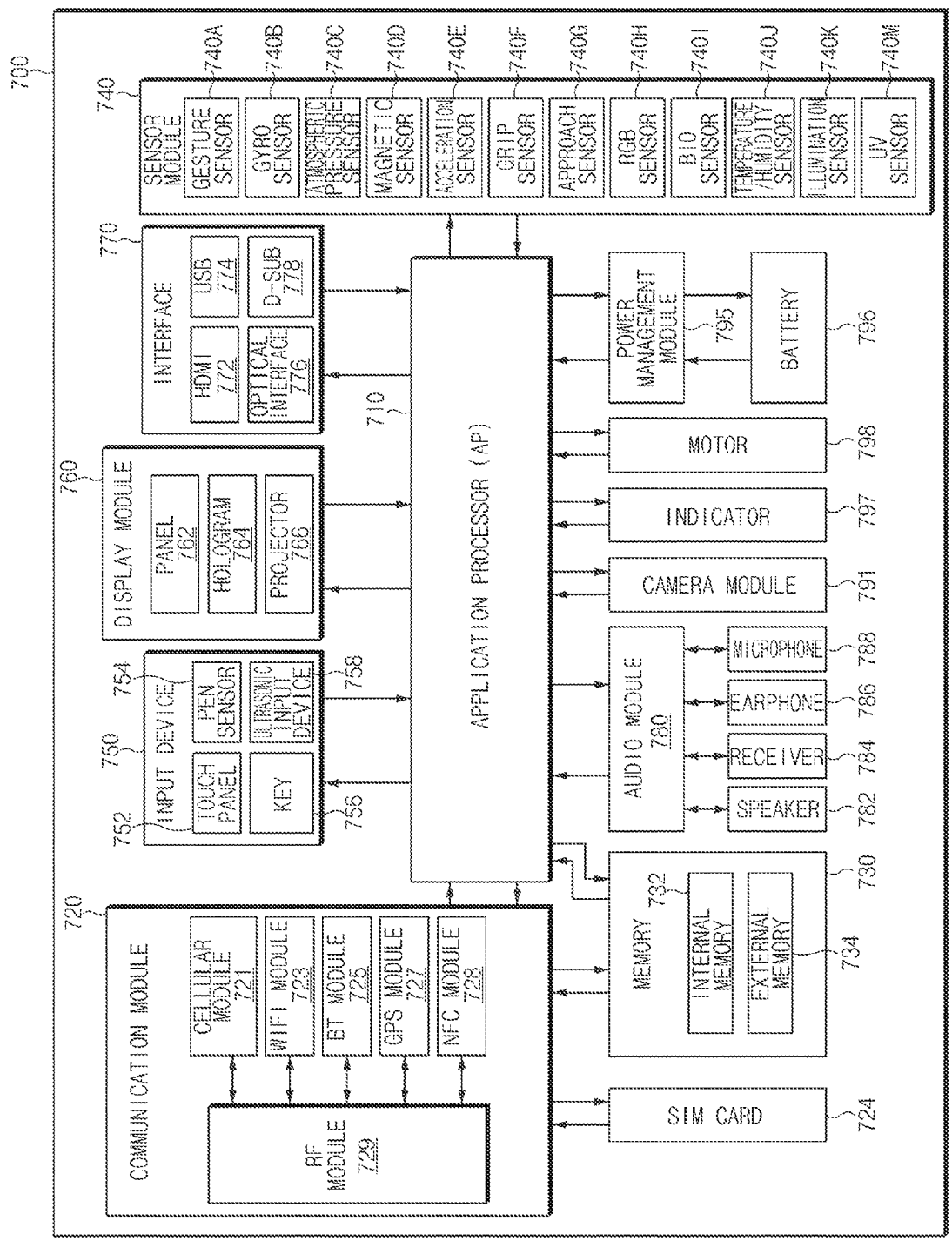
FIG. 7 is a block diagram schematically illustrating an electronic device according to various embodiments of the present disclosure.

FIG. 7 is a block diagram illustrating an electronic device according to various embodiments of the present disclosure.

An electronic device 700 may include all or a part of an electronic device 100 illustrated in FIG. 1. The electronic device 700 may include one or more processors (e.g., an AP) 710, a communication module 720, a subscriber identification module (SIM) card 724, a memory 730, a sensor module 740, an input device 750, a display 760, an interface 770, an audio module 780, a camera module 791, a power management module 795, a battery 796, an indicator 797, and a motor 798.

The processor 710 (e.g., a control module 130) may drive, for example, an operating system (OS) or an application to control a plurality of hardware or software components connected to the processor 710 and may process and compute a variety of data including multimedia data. The processor 710 may be implemented with a system on chip (SoC), for example. According to an embodiment of the present disclosure, the processor 710 may further include a graphic processing unit (GPU) (not illustrated) and/or an image signal processor (ISP). The processor 710 may include a part (e.g., a cellular module 721) of components illustrated in FIG. 7. The processor 710 may load instructions or data, received from at least one of other components (e.g., a nonvolatile memory), onto a volatile memory and may store various data at a nonvolatile memory.

The communication module 720 may include a cellular module 721, a wireless-fidelity (Wi-Fi) module 723, a Bluetooth (BT) module 725, a global positioning system (GPS) module 727, a near field communication (NFC) module 728, and a radio frequency (RF) module 729.

The cellular module 721 may provide voice communication, video communication, a character service, an Internet service, and the like through a communication network. According to an embodiment of the present disclosure, the cellular module 721 may perform discrimination and authentication of the electronic device 700 within a communication network using a SIM (e.g., a SIM card 724), for example. According to an embodiment of the present disclosure, the cellular module 721 may perform at least a part of functions that the processor 710 provides. According to an embodiment of the present disclosure, the cellular module 721 may include a communication processor (CP).

Each of the Wi-Fi module 723, the BT module 725, the GPS module 727, and the NFC module 728 may include a processor for processing data exchanged through a corresponding module, for example. According to various embodiments of the present disclosure, at least a portion (e.g., two or more components) of the cellular module 721, the Wi-Fi module 723, the BT module 725, the GPS module 727, and the NFC module 728 may be included within one integrated circuit (IC) or an IC package.

The RF module 729 may transmit and receive data, for example, a communication signal (e.g., an RF signal). The RF module 729 may include a transceiver, a power amplifier module (PAM), a frequency filter, low noise amplifier (LNA), an antenna, or the like. According to various embodiments of the present disclosure, at least one of the cellular module 721, the Wi-Fi module 723, the BT module 725, the GPS module 727, or the NFC module 728 may transmit and receive an RF signal through a separate RF module.

The SIM card 724 may include, for example, a card and/or embedded SIM that includes a SIM and may include unique identify information (e.g., IC card identifier (ICCID)) or subscriber information (e.g., integrated mobile subscriber identity (IMSI)).

The memory 730 may include an internal memory 732 or an external memory 734. For example, the internal memory 732 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, or a not or (NOR) flash memory), a hard drive, or a solid state drive (SSD).

The external memory 734 may include a flash drive, for example, compact flash (CF), secure digital (SD), micro-SD, mini-SD, extreme digital (xD) or a memory stick. The external memory 734 may be functionally and/or physically connected to the electronic device 700 through various interfaces.

The sensor module 740 may measure a physical quantity or may detect an operation state of the electronic device 700. The sensor module 740 may convert the measured or detected information to an electric signal. Generally or additionally, the sensor module 740 may include at least one of a gesture sensor 740A, a gyro sensor 740B, an atmospheric pressure sensor 740C, a magnetic sensor 740D, an acceleration sensor 740E, a grip sensor 740F, an approach sensor (e.g., proximity sensor) 740G, a color sensor 740H (e.g., red, green, blue (RGB) sensor), a biometric (Bio) sensor 740I, a temperature/humidity sensor 740J, an illumination sensor 740K, or an UV sensor 740M. Although not illustrated, additionally or generally, the sensor module 740 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, a fingerprint sensor, and the like. The sensor module 740 may further include a control circuit for controlling at least one or more sensors included therein. According to a certain embodiment of the present disclosure, the electronic device 700 may further include a processor which is a part of the processor 710 or independent of the processor 710 and is configured to control the sensor module 740. The processor may control the sensor module 740 when the processor 710 remains at a sleep state.

The input device 750 may include a touch panel 752, a (digital) pen sensor 754, a key 756, or an ultrasonic input unit 758. The touch panel 752 may use at least one of capacitive, resistive, infrared and ultrasonic detecting methods. Also, the touch panel 752 may further include a control circuit. The touch panel 752 may further include a tactile layer. In this case, the touch panel 752 may provide a tactile reaction to a user.

The (digital) pen sensor 754 may be a part of a touch panel or may include a separate sheet for recognition. The key 756 may include, for example, a physical button, an optical key, a keypad, and the like. The ultrasonic input device 758, which is an input device for generating an ultrasonic signal, may enable the electronic device 700 to sense a sound wave through a microphone (e.g., a microphone 788) so as to identify data.

The display 760 (e.g., a display 110) may include a panel 762, a hologram device 764, or a projector 766. The panel 762 may be configured to be the same as or similar to a display 110 illustrated in FIG. 1. The panel 762 may be, for example, flexible, transparent or wearable. The panel 762 and the touch panel 752 may be integrated into a single module. The hologram device 764 may display a stereoscopic image in a space using a light interference phenomenon. The projector 766 may project light onto a screen so as to display an image. The screen may be arranged in the inside or the outside of the electronic device 700. According to an embodiment of the present disclosure, the display 760 may further include a control circuit for controlling the panel 762, the hologram device 764, or the projector 766.

The interface 770 may include, for example, a high-definition multimedia interface (HDMI) 772, a universal serial bus (USB) 774, an optical interface 776, or a D-sub-miniature (D-sub) 778. Additionally or alternatively, the interface 770 may include, for example, a mobile high definition link (MHL) interface, a SD card/multimedia card (MMC) interface, or an infrared data association (IrDA) standard interface.

The audio module 780 may convert a sound and an electric signal in dual directions. The audio module 780 may process, for example, sound information that is input or output through a speaker 782, a receiver 784, an earphone 786, or a microphone 788.

The camera module 791 for shooting a still image or a video may include, for example, at least one image sensor (e.g., a front sensor or a rear sensor), a lens (not illustrated), an ISP (not illustrated), or a flash (e.g., an light-emitting diode (LED) or a xenon lamp, not illustrated).

The power management module 795 may manage, for example, power of the electronic device 700. According to an embodiment of the present disclosure, a power management IC (PMIC) a charger IC, or a battery or fuel gauge may be included in the power management module 795. The PMIC may have a wired charging method and/or a wireless charging method. The wireless charging method may include, for example, a magnetic resonance method, a magnetic induction method or an electromagnetic method, and may further include a coil loop, a resonant circuit, a rectifier, and the like. The battery gauge may measure, for example, a remaining capacity of the battery 796 and a voltage, current or temperature thereof while the battery is charged. The battery 796 may include, for example, a rechargeable battery or a solar battery.

The indicator 797 may display a specific state of the electronic device 700 or a part thereof (e.g., the processor 710), such as a booting state, a message state, a charging state, and the like. The motor 798 may convert an electrical signal into a mechanical vibration and may generate vibration or a haptic effect. Although not illustrated, a processing device (e.g., a GPU) for supporting a mobile TV may be included in the electronic device 700. The processing device for supporting a mobile TV may process media data according to the standards of digital multimedia broadcasting (DMB), digital video broadcasting (DVB) or media flow.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

A display method of an electronic device according to various embodiments of the present disclosure may be implemented with a program which is executable on an electronic device. The program may be stored and used at various kinds of storage media.

In particular, a program code for executing the above-described methods may be stored at various kinds of non-volatile storage media such as a flash memory, a ROM, an EPROM, an EEPROM, a hard disk, a removable disk, a memory card, a USB memory, a CD-ROM, and the like.

According to various embodiments of the present disclosure, a computer-readable recording method may include a program which performs a method. The method may include displaying first contents at a first area, displaying second contents at a second area connected with the first area, and expanding and displaying the first contents into a part of the second area and displaying third contents in a remainder of the second area, if a first screen change event occurs.

According to various embodiments of the present disclosure, in the case where sub contents are not used, main contents may be displayed at an area where sub contents are not displayed, thereby making it possible to change a screen ratio freely and maximizing the use area of a display.

According to various embodiments of the present disclosure, a virtual bezel image may be displayed when main contents are displayed at a second area, thereby preventing user's eyes from being broken up and improving the concentration on a screen.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display for displaying:
first contents in a first area of the display, and
second contents in a second area of the display adjacent to the first area; and
at least one processor configured, in response to a first screen change event, to:
expand and display the first contents in a part of the second area in place of the second contents corresponding to the part of the second area, and
display third contents in a remainder of the second area in place of the second contents corresponding to the remainder of the second area,
wherein the remainder of the second area is an edge area of the second area located on an opposite side of the first area.

2. The electronic device of claim 1,
wherein the first area comprises a flat surface, and
wherein at least a portion of the second area comprises a curved surface.

3. The electronic device of claim 1, wherein the at least one processor is further configured to, if the first screen change event occurs, control to gradually expand the first contents from a dividing line between the first area and the second area during a specified time.

4. The electronic device of claim 1, wherein the third contents comprise a bezel image.

5. The electronic device of claim 4, wherein the bezel image is displayed to have continuity with a bezel of the electronic device.

6. The electronic device of claim 4, wherein the bezel image comprises a text.

7. The electronic device of claim 1, further comprising:
an input interface configured to receive touch manipulation,
wherein the at least one processor is further configured to control to recognize a specific touch manipulation provided in the second area, if the third contents are displayed in the remainder of the second area.

8. The electronic device of claim 1, wherein the at least one processor is further configured to control to display the second contents in the second area, if a second screen change event occurs in a state where the third contents are displayed in the remainder of the second area.

9. The electronic device of claim 8, wherein the at least one processor is further configured to control such that the second contents are displayed to be overlapped with the first contents.

10. The electronic device of claim 9, wherein the at least one processor is further configured to control such that the second contents displayed to be overlapped are transparently displayed.

11. The electronic device of claim 8, wherein the at least one processor is further configured to control to:
reduce an area, in which the first contents are displayed, to the first area, and
display the second contents in the second area.

12. A method for displaying of an electronic device, the method comprising:
displaying first contents in a first area of a display;
displaying second contents in a second area of the display adjacent to the first area; and
in response to a first screen change event,
expanding and displaying the first contents in a part of the second area in place of the second contents corresponding to the part of the second area, and
displaying third contents in a remainder of the second area in place of the second contents corresponding to the remainder of the second area,
wherein the remainder of the second area is an edge area of the second area located on an opposite side of the first area.

13. The method of claim 12, wherein the expanding and displaying of the first contents comprises:
expanding the first contents from a dividing line between the first area and the second area gradually during a specified time.

14. The method of claim 12, wherein the third contents comprise a bezel image.

15. The method of claim 14, wherein the displaying of the third contents at the remainder of the second area comprises:
displaying the bezel image at the remainder of the second area for continuity with a bezel of the electronic device.

16. The method of claim 14, wherein the bezel image comprises a text.

17. The method of claim 12, further comprising:
recognizing a specific touch manipulation provided in the second area, if the third contents are displayed in the remainder of the second area.

18. The method of claim 12, further comprising:
displaying the second contents at the second area, if a second screen change event occurs at a state where the third contents are displayed in the remainder of the second area.

19. The method of claim 18, wherein the displaying of the second contents at the second area comprises:
displaying the second contents as being overlapped with the first contents.

20. The method of claim 19, wherein the second contents are transparently displayed.

21. The method of claim 18, wherein the displaying of the second contents at the second area comprises:
reducing an area, in which the first contents are displayed, to the first area and displaying the second contents in the second area.

22. A non-transitory computer-readable storage medium configured to store one or more computer programs including instructions that, when executed by at least one processor, cause the at least one processor to control for:
displaying first contents in a first area of a display;
displaying second contents in a second area of the display adjacent to the first area; and
in response to a first screen change event,
expanding and displaying the first contents in a part of the second area in place of the second contents corresponding to the part of the second area; and
displaying third contents in a remainder of the second area in place of the second contents corresponding to the remainder of the second area,
wherein the remainder of the second area is an edge area of the second area located on an opposite side of the first area.

* * * * *